United States Patent [19]
Russell
[11] E Patent Number: Re. 32,328
[45] Reissued Date of Patent: Jan. 13, 1987

[54] MAIL EXTRACTING AND SORTING DESK

[75] Inventor: Robert J. Russell, Philadelphia, Pa.

[73] Assignee: Opex Corporation, Cherry Hill, N.J.

[21] Appl. No.: 875,602

[22] Filed: Feb. 6, 1978

Related U.S. Patent Documents

Reissue of:

[64] Patent No.: 3,979,884
Issued: Sep. 14, 1976
Appl. No.: 510,778
Filed: Sep. 30, 1974

[51] Int. Cl.[4] ..... B65B 43/30
[52] U.S. Cl. ..... 53/381 R; 53/386
[58] Field of Search ..... 53/381 R, 386, 570, 53/571, 573, 569; 83/912

[56] References Cited

U.S. PATENT DOCUMENTS

| | | | |
|---|---|---|---|
| 2,689,073 | 9/1954 | Twigg | 53/570 |
| 2,806,335 | 9/1957 | McWhirter | 53/507 |
| 3,143,100 | 8/1964 | Krupotich | 53/381 R |
| 3,384,252 | 5/1968 | West | 53/381 R X |
| 3,579,948 | 5/1971 | Lerner | 53/386 X |
| 3,691,726 | 9/1972 | Stephens et al. | 53/381 R |
| 3,955,334 | 5/1976 | Wild et al. | 53/386 X |
| 4,016,708 | 4/1977 | DeHart | 53/386 X |
| 4,050,222 | 9/1977 | Stephens et al. | 53/569 X |
| 4,159,611 | 7/1979 | Russell | 53/569 |

*Primary Examiner*—James F. Coan
*Attorney, Agent, or Firm*—Weiser & Stapler

[57] ABSTRACT

Apparatus is disclosed for extracting and sorting mail from envelopes which had one edge thereof already severed. The plurality of envelopes with their edges already severed are placed into a hopper and fed from the hopper to a pair of conveyor belts operating along a vacuum manifold through which a vacuum is drawn. The conveyor is indexed to move the envelope to a work station at which two opposed vacuum cups pull the sides of the envelope into an open position to facilitate quick removal of the contents. While the operator is sorting the contents of the envelope into sorting compartments, the conveyor is again indexed to bring the next envelope into place whereupon it is drawn into an open position. An inspection device, such as a photocell arrangement, is positioned at an inspection station to check that the contents have been completely removed.

13 Claims, 3 Drawing Figures

MAIL EXTRACTING AND SORTING DESK

Matter enclosed in heavy brackets [ ] appears in the original patent but forms no part of this reissue specification; matter printed in italics indicates the additions made by reissue.

BACKGROUND OF INVENTION

The extracting and sorting desk of the present invention is involved in the general field of devices for opening and extracting the contents of mail. Over the past several years, the quantity of mail being handled by companies such as credit card companies, oil companies and the like has been steadily increasing and has reached a point where the mere task of opening and removing the contents of the mail presents a very large burden.

In companies such as credit card companies, mailrooms, which simply open the mail and sort the mail, employ literally hundreds of people. In situations such as these, there is an extremely urgent need for equipment which will reduce the time and expense in processing this mail.

Various types of equipment are available today for use in mailroom devices speed up the process and reduce the costs. One type of equipment available is a complete processing apparatus which will take unopened mail and completely open the envelope on three sides and present the envelope and contents thereof to the operators on a conveyor. Apparatus of this type works well and has proved a valuable asset in the mailrooms. Nevertheless, this type of apparatus is extremely large and expensive and is limited in use to extremely large volume mail users.

Other equipment which is available for aid in the mailrooms are deviced which will slit or open only one edge of the envelope. One such device in common use is the well known Pitney Bowes slitter. However, devices like this, while inexpensive and quick in severing the one edge of the envelope, still leave the contents within the envelope and require the mailroom employees to go through the phisical task of pulling apart the envelope and removing the contents of the envelope.

At first impression, it would appear that the relatively minor time involved in a mailroom employee pulling open an envelope which has previously been opened on one edge would be insignificant in the overall picture. However, studies reveal that this time is, in fact, relatively significant. The operator must physically pick up the envelope, work to open the envelope and then remove the contents and thereafter, dispose of the envelope itself. Then, the operator will proceed to sort the contents of the envelope. The actual act of picking up the envelope, opening it and discarding the envelope does represent a significant portion of the total time involved in situations where the sort itself is relatively simple, i.e. where the envelope contains only a check and bill stub.

A further problem in the manual opening and removal of mail is the problem of missed contents. Operators, in their efforts to work quickly, will often leave contents in the envelope.

What is needed in the industry is an intermediate machine which will take mail which has been previously opened and will reduce the time on the part of the operator in physically handling the mail and pulling apart the sides of the envelope prior to removing the contents. Additionally, means are required to detect the presence of contents of the envelopes which were not removed by the operator.

Another problem which is encountered in the mail opening rooms is the actual lack of organization in the work areas of the employees. Only in the larger mail opening systems is there any provision made for desks which have trays and compartments for receipt of the mail during the sorting process. There is a lack in the industry of a system which is inexpensive but which will aid in the organization of the employees work area to facilitate sorting of the mail.

OBJECTS AND SUMMARY OF INVENTION

It is an object of the present invention to provide a mail extracting and sorting desk which will utilize mail which has been previously opened on one side in a manner to organize the work area of the operator to aid in sorting while also relieving the operator of the task of physically picking up the mail and opening the envelope to remove the contents thereof as well as discarding of the empty envelope.

It is a further object of the present invention to further provide a system for extracting and sorting mail which will guard against the disposal of an envelope which may still include contents which were overlooked.

The foregoing objects are carried out in the present invention by utilizing a feed hopper into which mail which has been opened on one side is placed. A feed device adjacent the feed hopper takes the envelopes, one at a time, from the feed hopper and deposits them onto a pair of parallel belts operating along an extended vacuum manifold. Ports or holes in the vacuum manifold between the parallel belts produce a suction against the envelope which holds the envelope securely onto the belts.

An indexing device is provided in the extracting and sorting desk which, at predetermined times, will initiate operation of the conveyor belts and move the envelope from the feeding station to a work station. A pair of opposed suction cups are positioned at the work station. The suction cups are extended into contact with the sides of the envelope and thereafter, retracted to pull apart the side panels of the envelope exposing the contents of the envelope. The operator then need only reach into the envelope and remove the contents.

Immediately upon removal of the contents of the envelope by the operator, the operator engages a switch which will then initiate the next cycle upon which the next following envelope is moved into the work station and the side panels drawn apart. The envelope which was previously at the work station is moved into an inspection station at which a candling device, such as a photocell and light, inspect the envelope for missed contents. The envelope which was previously at the inspection station is discarded into a waste receptacle as the next following envelope moves into the inspection station.

Initiation of the cycle in which an envelope is moved from the feed station to the work station occurs immediately upon removal of the contents of the envelope at the work station by the operator. In this manner, the time required for the mechanical process of moving the envelope from the feed station to the work station and drawing the envelope panels apart is accomplished during the time the operator is sorting the mail. Thus, the controlling time factor is how quickly the operator can sort the mail and the time elements heretofore involved in the process of the operator picking up the envelope, pulling apart the envelope before extracting the contents and discarding of the envelope are completely eliminated.

Other objects and advantages of the present invention will become apparent to those skilled in the art from the detailed description thereof which follows taken in conjunction with the drawings.

DETAILED DESCRIPTION OF DRAWINGS

DETAILED DESCRIPTION OF INVENTION

Figure 1:
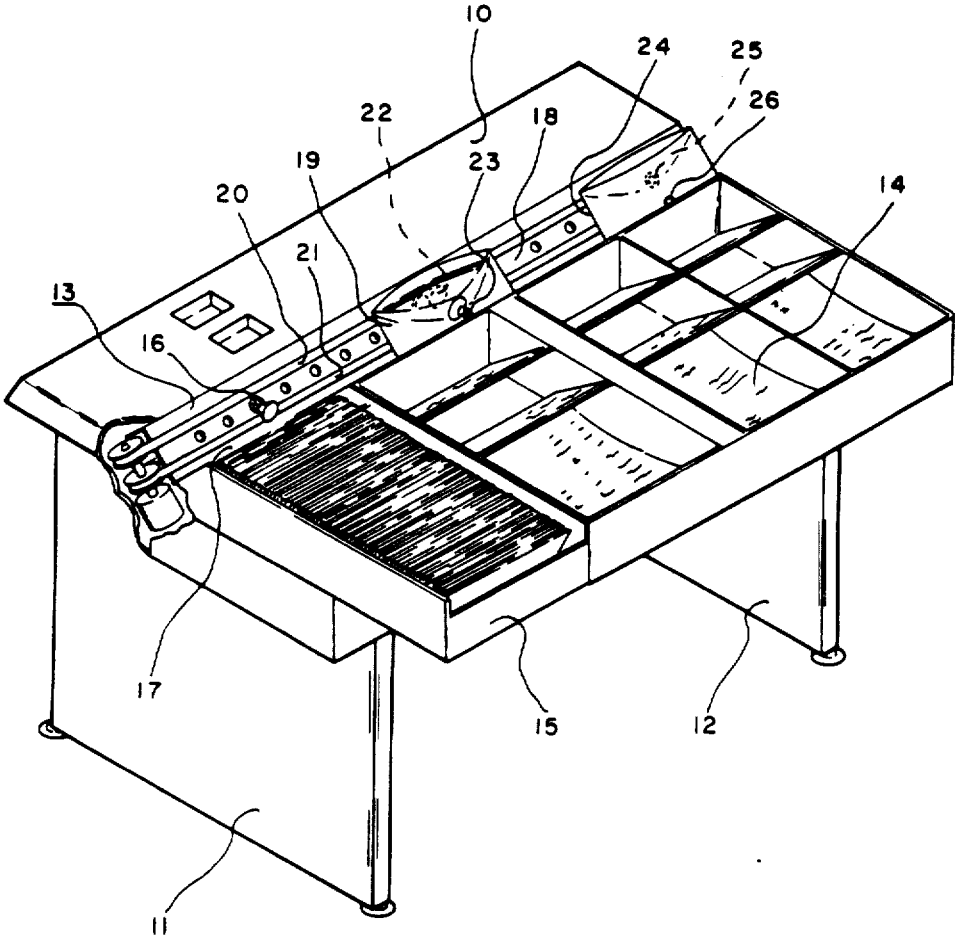
FIG. 1 is a perspective view of the extracting and sorting desk of the present invention.

The extracting and sorting desk of the present invention is shown in perspective view in FIG. 1 of the drawings. The desk includes a work surface 10 which is supported by parallel side panels 11 and 12 in a conventional manner. Forward of the work surface 10 is positioned an inclined conveyor 13 which extends along the entire length of the work surface. Behind the conveyor is positioned a plurality of sorting trays 14. Lastly, a feed hopper 15 is positioned adjacent the sorting trays and the conveyor as shown in FIG. 1.

During use, an operator is positioned on a chair or the like at the work station 10. A control switch (not shown) such as a foot pedal or knee operated device is actuated by the operator.

When the switch is operated, the conveyor 13 is placed into operation and an envelope which was positioned at a feed station 17 is caused to move to a work station 18. Thereafter, a suction arm 16 positioned behind the conveyor 13 advances toward the feed hopper 15 and secures the next envelope. The arm 16 retracts into the conveyor 13 and the envelope is deposited upon a pair of conveyor belts 20 and 21.

As will be described in more detail hereinafter, the sorting desk includes a conveyor indexing system which will sense when the envelope has been moved from the feed station 17 to the work station 18. As the envelope 19 reaches the work station 18, the conveyor operation is discontinued. Thereafter, a movable suction arm 23 extends from the opposite side of the conveyor against one panel of the envelope. As the arm engages the side panel of the envelope 19, it forces the opposite side panel of envelope against a stationary suction arm 22. A vacuum is drawn through both suction arms 22 and 23. Momentarily thereafter, the movable suction arm 23 is retracted away from the conveyor 13 and the side panels of the envelope are consequently drawn apart as shown in FIG. 1. At this point, the operator, who has just completed sorting of the contents from the previous envelope, may then reach into the envelope 19 and remove the contents therefrom. As soon as this is done, the operator then hits the operating switch and continues to sort the contents.

When the operating switch is engaged by the operator, the suction in the suction arms 22 and 23 is released while simultaneously the conveyor operation is initiated, as previously discussed, and the envelope 19 moved from the work station 18 to an inspection station 24. Simultaneously, the next following envelope at the feed station is moved to the work station and the panels thereof drawn apart as previously described.

The inspection station 24 includes a candling device, such as a photocell 25 and light 26. The photocell and light combination candle the envelope for detection of any missed contents. If any contents are sensed, a signal such as an alarm or light may be initiated to advise the operator. As the cycle proceeds, each envelope which has been candled is then advanced into a waste receptacle (not shown) as the next envelope moves from the work station to the inspection station.

The sorting desk includes the plurality of sorting trays 14 positioned beyond the work station 18. The sorting trays are positioned in this manner in order that the operator may conveniently sit at the sorting desk and merely remove the contents from the envelope 19 and position them into appropriately designated trays without having to unduly reach beyond the work surface 10. The organization of the sorting trays directly in front of the operator and positioned to each side of the work station greatly accelerates the performance of the operator in sorting the contents of the envelope.

Figure 2:
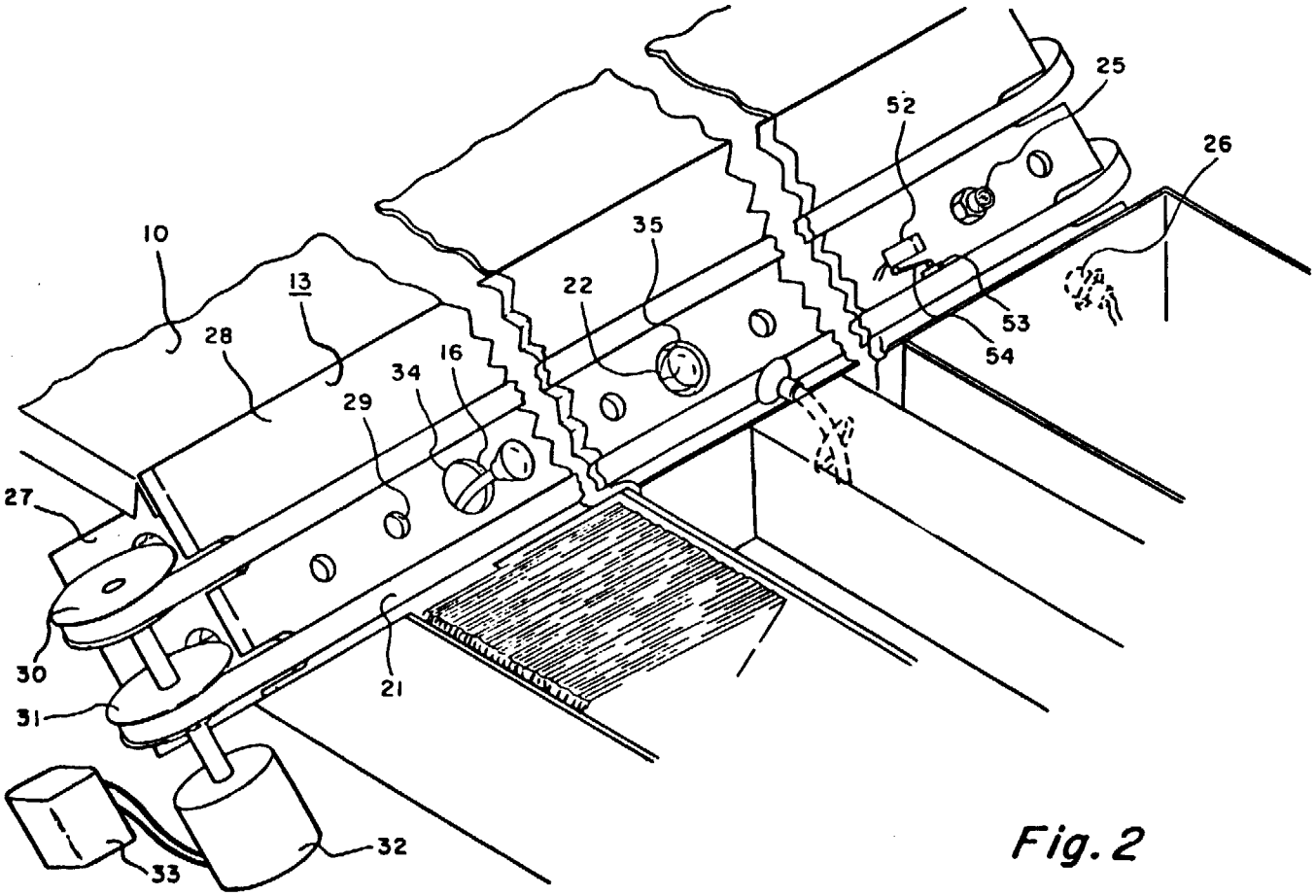
FIG. 2 is a perspective view of the details of the conveyor and work station of the sorting and extracting desk of the present invention.

The details of the conveyor system employed in the extracting and sorting desk of the present invention are shown in FIG. 2 of the drawings. The conveyor 13 consists of a vacuum plenum 27 which extends throughout the width of the sorting desk. The vacuum plenum is essentially a rectangular elongate chamber which includes an elongate conveyor surface plate 28 inclined at a slight angle to the work surface 10 and which extends for the entire length of the plenum chamber. The conveyor surface plate 28 includes a plurality of apertures or holes 29.

A high volume fan (not shown) is positioned in the center underneath portion of the plenum chamber. The fan operates to draw a slight vacuum in the plenum chamber.

The conveyor system utilizes two conveyor belts 20 and 21. The conveyor belts 20 and 21 are disposed around pulleys 30 and 31 disposed at both ends of the plenum chamber. A drive motor 32 is operated through appropriate relay device 33 and drives both pulleys 30 and 31 to operate the conveyor belts 20 and 21.

In operation, the feed arm 16 extends from a large aperture 34 in the conveyor surface plate 28 and comes into contact with the next envelope in the feed hopper 15. The mechanism for operating the feed arm 16 is disposed within the plenum chamber 27 and is shown in detail in FIG. 3 and will be described hereinafter.

At an appropriate time in the cycle the feed arm 16 retracts back into the aperture 34. As this occurs, the envelope is pulled into contact with the belts 20 and 21 which are stationary at this time. The vacuum within the plenum chamber draws air through the apertures 29. As the envelope comes into contact with the belt, the slight vacuum in the plenum chamber tends to hold the envelope against the belts 20 and 21. When the conveyor belts are operated, the envelope moves with the belts along the conveyor surface plate and is held in place by the vacuum in the respective apertures which are encountered by the envelope as it moves toward the work station.

As may be seen in FIG. 2, the stationary suction arm 22 is positioned in a larger aperture 35. The suction arm 22 is positioned slightly below the outer surface of the conveyor surface plate 28.

Figure 3:
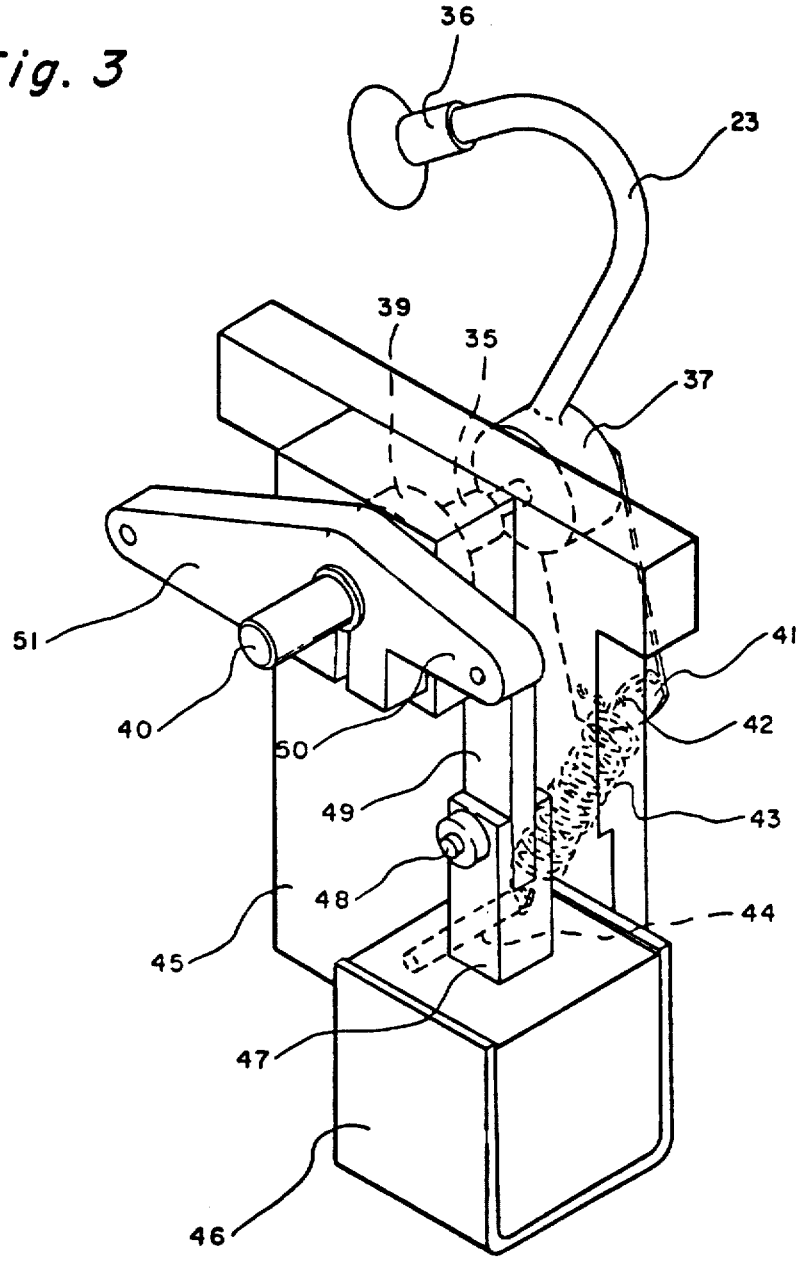
FIG. 3 is a perspective view of the details of the suction arm and driving mechanism for pulling the envelope panels apart of the present invention.

The suction arm 16 utilized at the feed station and the movable suction arm 23 and mechanism for operating them is essentially identical and shown in FIG. 3 of the drawings. Referring to FIG. 3, the suction arm 23 is a hollow tube and includes a suction cup 36 on one end of the arm. The opposite end of the arm terminates in a round boss 37 which is appropriately journaled on an axle 38 passing through a bearing 39. The opposite end of the axle terminates in a hollow flexible hose connection 40 to which the vacuum line is attached.

A crank arm 41 is provided and is secured to the boss 37 at one end. The opposite end of the crank arm 41 includes a plurality of apertures 42 into which a tension spring 43 is connected at one end. The opposite end of the tension spring 43 is connected into an anchor pin 44 secured into the base frame member 45 of the actuating mechanism. The spring 43 serves to maintain the suction arm 23 in retracted position.

Actuation of the mechanism is accomplished by means of a solenoid 46. The solenoid operates through a first connecting arm 47 which is appropriately interconnected through a pin 48 to a second thrust arm 49. The upper end of the thrust arm 49 is appropriately journaled into an arm 50 of a bell crank 51.

The solenoid 46 is of a type that, when actuated, extends its driving shaft 47. Accordingly, upon energization of the solenoid 46, the bell crank 51 will be rotated in a counterclockwise direction causing the suction arm 23 to extend or come into contact with the envelope.

Control of the stoppage of the conveyor belts to position an envelope at the work station is accomplished by means of a microswitch 52 as shown in FIG. 2. The microswitch 52 is positioned in a recess manner in the conveyor surface plate 28 and has an actuating arm 54 which extends slightly above the surface of the plate but below the outer surface of the belts 20 and 21.

The lower belt 21 includes a plurality of small raised projections or cams 53 spaced along the belt. The spacing between the cams 53 is equal to the spacing between the center line of the feed hopper and the center line of the work station 18. In this manner, whenever the operating switch is engaged, relay 33 on the motor 32 is energized and the belts continue to move until the next cam projection 53 engages the arm 54 of the microswitch 52. When this occurs, the relay 33 is reset to off position and the conveyor is stopped. The envelope which will have been adhering to the belts 20 and 21 of the conveyor will thus have moved exactly into position at the work station. Each actuation of the operating switch sets relay 33 for operation and the microswitch 52 resets the relay for off position.

The suction arm 16 and associated mechanism as shown in FIG. 3 of the drawing is likewise caused to operate by the operating switch. However, the solenoid 46 is associated with a time delay relay (not shown). Whenever the operating switch is actuated, the time delay relay is thus actuated and, upon timing out, then causes the solenoid 46 to operate. The reason for the initial delay is to permit the envelope already in position on the belts at the feed station to be able to move past the aperture 34 toward the work station 18.

After the time delay, the solenoid 46 is actuated as above stated. When the solenoid is actuated, the suction arm 16 will engage an envelope and adhere to the envelope. The time delay device includes a second timing mechanism which will time out causing the solenoid 46 to thus be deenergized. As this occurs, the spring will now return the arm to its rest position behind the aperture 34 and the envelope will thus be in position on the belts for the next sequence in the operation. The timing out of the timing device is such that the envelope is not brought to the belt until the belts have been stopped by the microswitch 52 as above described.

The movable suction arm 23 and its associated mechanism are controlled such that the arm is in retracted position as shown in FIG. 2 when the envelope arrives at the work station. Whenever microswitch 52 is tripped indicating arrival of the envelope at the work station, the microswitch likewise initiates energization of the relay 46 associated with the operating mechanism of the suction arm to cause the suction arm to go into its extended position to engage the envelope. Simultaneously, the microswitch energizes a vacuum relay (not shown) which turns on the vacuum to both the stationary and movable suction arms.

A further time delay device (not shown) is associated with the solenoid for the movable suction arm 23. Timing of this device is initiated upon energization of the microswitch 52 when the envelope arrives at the work station. After a short time interval permitting extension of the movable suction arm 23 and firm adherence to the envelope, the second timing device times out and the relay 46 is deenergized. As this occurs, the spring 43 in the mechanism for the movable suction arm bring the suction arm into retracted position wherein it stays at rest until the initiation of the next cycle. In this manner, the side panels of the envelope will be held open until the operator removes the contents and trips the operating switch to begin the next cycle.

The description of the extracting and sorting desk has been made in respect to a particular embodiment thereof shown in the drawings. Other variations and modifications of the invention will now be apparent to those skilled in the art. Accordingly, no limitation as to the scope and spirit of invention was intended by the particular embodiment thereof shown in the drawings but the scope of the invention is to be interpreted in view of the claims.

I claim:

1. Apparatus facilitating extracting and sorting of the contents from envelopes which have been opened on one edge only comprising:

a feed hopper into which a plurality of envelopes to be processed are placed;

fully exposed conveyor means having a feed station and an opening station[;], and of configuration to convey an envelope with the opened edge positioned generally upwardly fully exposed along the length of the conveyor means;

a substantially flat and continuous work surface extending along and above the conveyor means between the feed station and the [work] *opening* station;

feed means for feeding mail from the feed hopper to the feed station of the conveyor means at [predetermined times] *the start of each of a plurality of operating cycles of the apparatus;*

Conveyor indexing means operating the conveyor means to convey mail from the feed station to the [work] *opening* station at predetermined times *in relation to each said cycle*; and separating means at the opening station only for drawing the side panels of the envelope apart to expose the contents thereof for ease of removal.

2. The apparatus of claim 1 wherein the separating means includes opposed suction members disposed on each side of the envelope which sequentially extend into engagement with the envelope and retract therefrom to draw the sides of the envelope apart.

3. The apparatus of claim 1 wherein the conveyor means includes an elongate vacuum manifold including a plurality of suction holes therein and at least one continuous conveyor belt positioned adjacent the plurality of holes whereupon an envelope positioned on the belt will be held into conveying engagement with the belt by the suction drawn through the plurality of holes.

4. The apparatus of claim 3 wherein the feed means is a suction member and is positioned within the elongate manifold and is operable to extend from the manifold to pick up an envelope and retract into the manifold to position the envelope against the conveyor belt.

5. The apparatus of claim 1 wherein the conveyor means further includes an inspection station and further including inspection means at the inspection station for determining whether the entire contents of the envelope have been removed.

6. The apparatus of claim 1 further including a plurality of sorting compartments positioned adjacent the work station to receive the sorted mail.

7. The apparatus of claim 1 wherein the conveyor indexing means is actuated immediately upon the removal of the contents of the envelope to position the following enevelope for extraction while sorting of the previously removed contents occurs.

[8. Apparatus facilitating extracting and sorting of the contents from envelopes which have been opened on one edge comprising:

a feed hopper into which a plurality of envelopes to be processed are placed;

Conveyor means including an elongate vacuum manifold having a plurality of suction holes therin and at least one continuous conveyor belt positioned adjacent the plurality of holes such that an envelope positioned on the belt will be held into conveying engagement with the belt by the suction drawn through the plurality of holes.

feed means for feeding mail from the feed hopper to the feed station of the conveyor means at predetermined times;

conveyor indexing means operating the conveyor means to convey mail from the feed station to the work station at predetermined times; and separating means at the work station for drawing the side panels of the envelope apart to expose the contents therof for ease of removal.]

9. The apparatus of claim [8] *14* wherin the feed means is a suction member and is positioned within the elongate manifold and is operable to extend from the manifold to pick up an envelope and retract into the manifold to position the envelope against the conveyor belt.

*10. Apparatus facilitating extracting and sorting of the contents from envelopes which have been opened on one edge comprising:*

*a feed hopper into which a plurality of envelopes to be processed are placed;*

*conveyor means having a feed station and a work station;*

*a substantially flat work surface extending along the conveyor means in the vicinity of the work station;*

*said conveyor means being of configuration to convey an envelope with the opened edge generally toward the work surface along the length of the conveyor means;*

*feed means for feeding mail from the feed hopper to the feed station of the conveyor means at operator-determined times;*

*conveyor indexing means operating the conveyor means to convey mail from the feed station to the work station at predetermined times relative to the operator-determined times; and*

*separating means at the work station only for drawing the side panels of the envelope apart to expose the contents thereof for ease of removal,*

*the separating means being constructed to maintain the envelope at the work station opened and generally upwardly fully exposed and with the drawn-apart side panel nearest the conveyor means inclined upwardly at an angle to the flat work surface and with the panel farthest from the conveyor means inclined upwardly at a greater angle to the flat working surface.*

*11. The apparatus of claim 10 further comprising means supplementing the force of gravity for retaining each envelope against the conveyor means while being conveyed between the feed station and the work station.*

*12. Apparatus facilitating extracting and sorting by an operator of the contents from envelopes which have been opened on one edge comprising:*

*a feed hopper into which a plurality of envelopes to be processed are placed;*

*fully exposed conveyor means having a feed station and an opening station, and of configuration to convey an envelope fully exposed along the length of the conveyor means and with the one opened edge of the envelope positioned so that it faces generally upwardly;*

*a substantially flat and continuous work surface extending along and above the conveyor means between the feed station and the opening station;*

*feed means for feeding mail from the feed hopper to the feed station of the conveyor means at operator-determined times;*

*conveyor indexing means operating the conveyor means to convey mail from the feed station to the opening station at predetermined times relative to the operator-determined times; and*

*separating means at the opening station only for drawing the side panels of the envelope apart to expose the contents thereof for ease of removal.*

*13. Apparatus facilitating extracting and sorting by an operator of the contents from envelopes which have been opened on one edge comprising:*

*a feed hopper into which a plurality of envelopes to be processed are placed;*

*conveyor means including an elongate vacuum manifold having a plurality of suction holes therein and at least one continuous conveyor belt positioned adjacent the plurality of holes such that an envelope positioned on the belt will be held into conveying engagement with the belt by the suction drawn through the plurality of holes;*

*feed means for feeding mail from the feed hopper to a feed station of the conveyor means at operator-determined times;*

*conveyor indexing means operating the conveyor means to convey mail from the feed station to a work station at predetermined times relative to the operator-determined times; and*

*separating means at the work station for drawing the side panels of the envelope apart to expose the contents thereof for ease of removal.*

*14. Apparatus facilitating extracting and sorting by an operator of the contents from envelopes which have been opened on one edge comprising:*

*a feed hopper into which a plurality of envelopes to be processed are placed;*

*a conveyor means having a feed station and an opening station;*

*a substantially flat work surface extending along the conveyor means in the vicinity of the opening station;*

*said conveyor means being of configuration to convey an envelope with the one opened edge generally toward the work surface along the length of the conveyor means;*

*feed means for feeding mail from the feed hopper to the feed station of the conveyor means at operator-determined times;*

*conveyor indexing means operating the conveyor means to convey mail from the feed station to the opening station at predetermined times relative to the operator-determined times; and*

*separating means at the opening station only for drawing the side panels of the envelope apart to expose the contents thereof for ease of removal;*

*the separating means being constructed to maintain the envelope at the opening station with the opened edge generally upwardly fully exposed and with the drawn-apart side panel nearest the conveyor means inclined upwardly at an angle to the flat work surface.*

* * * * *